US011582236B2

United States Patent
Sasaki

(10) Patent No.: US 11,582,236 B2
(45) Date of Patent: Feb. 14, 2023

(54) IMAGE FORMING APPARATUS AND CONTROLLING METHOD

(71) Applicant: TOSHIBA TEC KABUSHIKI KAISHA, Tokyo (JP)

(72) Inventor: Takahiro Sasaki, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 17/031,398

(22) Filed: Sep. 24, 2020

(65) Prior Publication Data

US 2022/0094685 A1  Mar. 24, 2022

(51) Int. Cl.
*H04L 29/06* (2006.01)
*H04L 9/40* (2022.01)
*G06F 21/60* (2013.01)
*G06F 21/62* (2013.01)

(52) U.S. Cl.
CPC ............ *H04L 63/10* (2013.01); *G06F 21/608* (2013.01); *G06F 21/6245* (2013.01); *H04L 63/083* (2013.01); *H04L 63/0807* (2013.01); *H04L 63/0853* (2013.01); *H04L 63/20* (2013.01)

(58) Field of Classification Search
CPC ... H04L 63/10; H04L 63/0807; H04L 63/083; H04L 63/0853; H04L 63/20; H04L 67/10; H04L 67/02; G06F 21/608; G06F 21/6245
USPC .......................................................... 726/4
See application file for complete search history.

(56) References Cited

U.S. PATENT DOCUMENTS

| 10,375,069 | B2 | 8/2019 | Matsugashita | |
|---|---|---|---|---|
| 2017/0347390 | A1* | 11/2017 | Cho | ...................... H04L 67/141 |
| 2018/0253268 | A1* | 9/2018 | Tonegawa | ............... G06F 21/62 |
| 2021/0336950 | A1* | 10/2021 | Miyamoto | ............ H04L 9/3271 |

FOREIGN PATENT DOCUMENTS

| CN | 106534143 A | 3/2017 |
|---|---|---|
| CN | 111355730 A | 6/2020 |
| JP | 2014-038608 A | 2/2014 |
| JP | 2019-149132 | 9/2019 |

OTHER PUBLICATIONS

Extended European Search Report dated Nov. 3, 2021 in EP Application No. 21175468.4, 7 pages.

* cited by examiner

*Primary Examiner* — Jeffrey C Pwu
*Assistant Examiner* — Nega Woldemariam
(74) *Attorney, Agent, or Firm* — Foley & Lardner LLP

(57) ABSTRACT

An image forming apparatus includes a communication interface and a processor. The communication interface is configured to transmit data to and receive data from a cloud server that provides a cloud service. The processor is configured to receive a token from the cloud server via the communication interface, transmit a request including the token to the cloud server via the communication interface, receive a response including user information from the cloud server via the communication interface, and shift to a login state based on the user information.

4 Claims, 7 Drawing Sheets

US 11,582,236 B2

IMAGE FORMING APPARATUS AND CONTROLLING METHOD

FIELD

Embodiments described herein relate generally to an image forming apparatus and a controlling method.

BACKGROUND

Some image forming apparatuses authenticate a user in cooperation with a cloud service. If the user is authenticated by the cloud service, such an image forming apparatus is shifted to a state in which the user is logged in.

In the related art, the image forming apparatus requires a cloud portal to cooperate with the cloud service.

In order to solve the above problem, an image forming apparatus capable of independently cooperating with the cloud service, and a controlling method are provided.

DETAILED DESCRIPTION

In general, according to one embodiment, an image forming apparatus includes a communication interface and a processor. The communication interface transmits data to and receives data from a cloud server that provides a cloud service. The processor receives a token from the cloud server via the communication interface, transmits a request including the token to the cloud server via the communication interface, receives a response including user information from the cloud server via the communication interface, and is shifted to a login state based on the user information.

Hereinafter, the embodiment will be described with reference to the drawings.

First Embodiment

First, a first embodiment will be described. An authentication system according to the embodiment authenticates a user by using a cloud service provided by a cloud server. If the authentication system authenticates a user, the authentication system shifts the image forming apparatus to a login state. If the image forming apparatus is in a login state, an image is formed on a medium such as paper according to an operation by a user.

Figure 1:
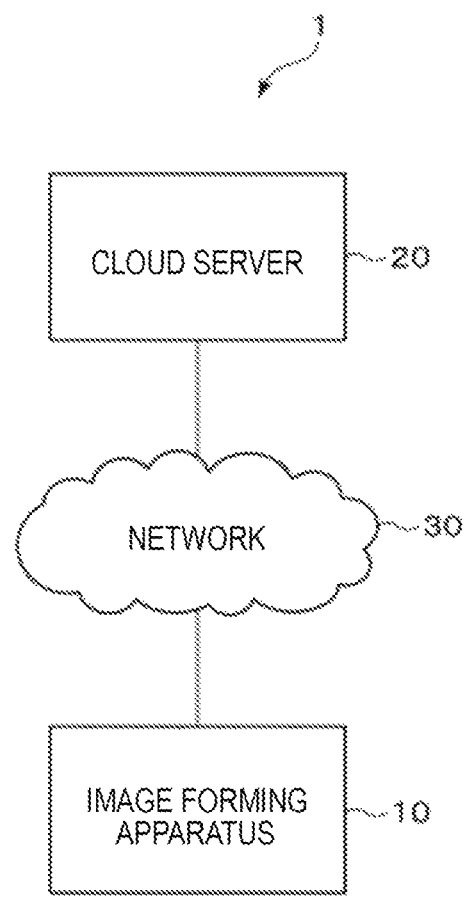
FIG. 1 is a block diagram illustrating a configuration example of an authentication system according to a first embodiment.

FIG. 1 illustrates a configuration example of an authentication system 1. As illustrated in FIG. 1, the authentication system 1 includes an image forming apparatus 10, a cloud server 20, a network 30, and the like. The image forming apparatus 10 and the cloud server 20 are connected to the network 30.

The image forming apparatus 10 is shifted to a login state relating to a predetermined user based on the information from the cloud server 20. If being shifted to the login state, the image forming apparatus 10 forms an image on a medium according to the operation and the like by the user. The image forming apparatus 10 will be described below.

The cloud server 20 provides the cloud service such as a user management service. The cloud service provided by the cloud server 20 is a service in which the user logs in with an ID and a password of the user and the like and uses. The cloud server 20 will be described below.

The network 30 is a communication network for transmitting and receiving data. The network 30 relays communication between the image forming apparatus 10 and the cloud server 20. Here, the network 30 is the Internet.

Figure 2:
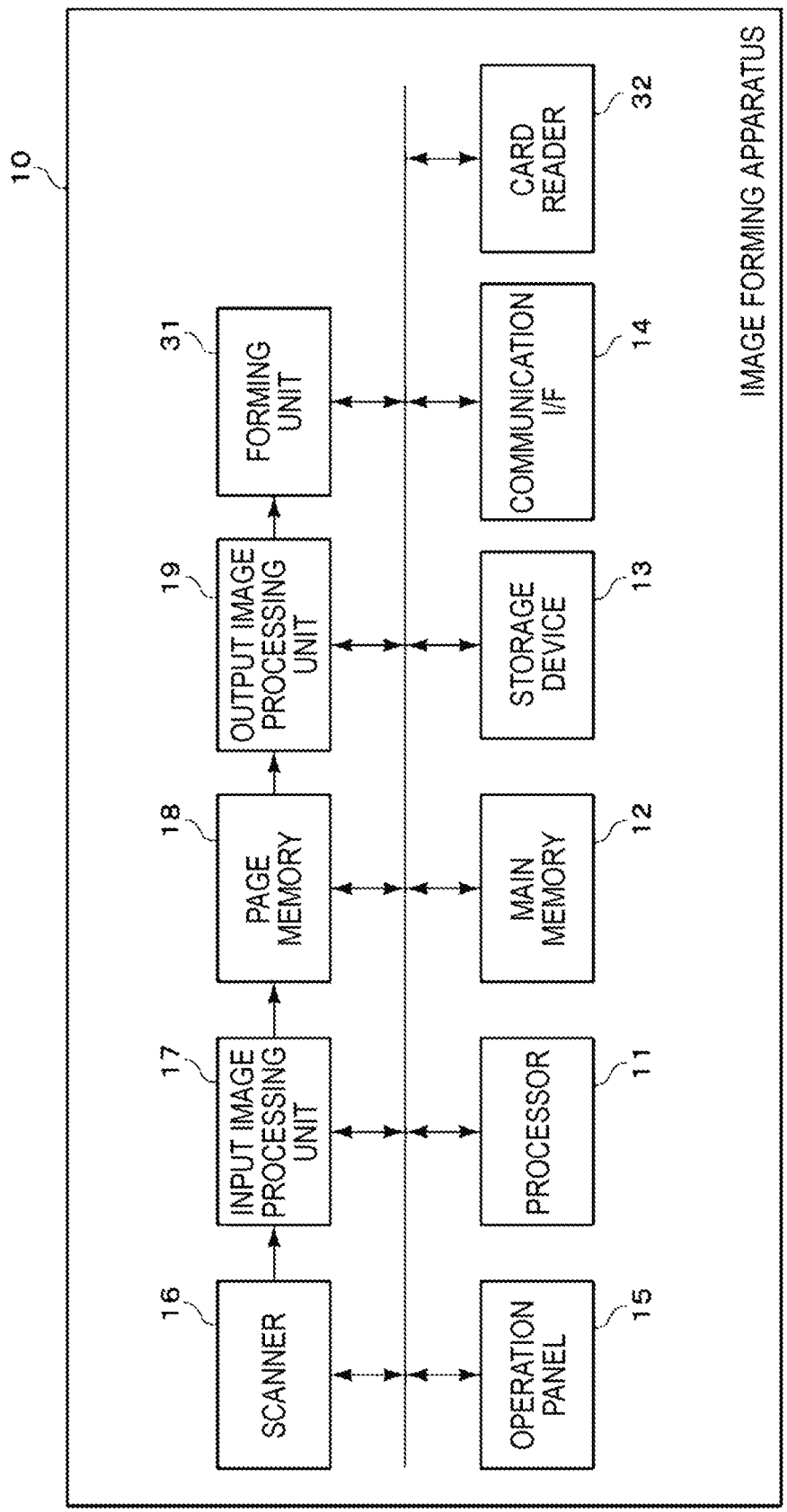
FIG. 2 is a block diagram illustrating a configuration example of an image forming apparatus according to the first embodiment.

FIG. 2 is a block diagram illustrating a configuration example of the image forming apparatus 10. As illustrated in FIG. 2, the image forming apparatus 10 includes a processor 11, a main memory 12, a storage device 13, a communication interface 14, an operation panel 15, a scanner 16, an input image processing unit 17, a page memory 18, an output image processing unit 19, a forming unit 31, a card reader 32, and the like. These units are connected to each other via a data bus and the like. The image forming apparatus 10 may include a configuration, if necessary, in addition to the configurations illustrated in FIG. 2, or a specific configuration may be omitted from the image forming apparatus 10.

The processor 11 has a function of controlling the entire operation of the image forming apparatus 10. The processor 11 may include an internal memory, various interfaces, and the like. The processor 11 realizes various processes by executing a program stored in an internal memory, the storage device 13, or the like in advance.

Some of the various functions realized by the processor 11 executing programs may be realized by a hardware circuit. In this case, the processor 11 controls the functions executed by the hardware circuit.

The main memory 12 is a volatile memory. The main memory 12 is a working memory or a buffer memory. The main memory 12 stores various application programs based on instructions from the processor 11. The main memory 12 may store data required for the execution of the application programs, execution results of the application programs, and the like.

The storage device 13 is a non-volatile memory in which data can be written and rewritten. For example, the storage device 13 is configured with a hard disk drive (HDD), a solid state drive (SSD), a flash memory, or the like. The storage device 13 stores control programs, applications, various kinds of data, and the like in response to the operational use of the image forming apparatus 10.

The communication interface 14 is an interface for performing communication with the network 30. That is, the communication interface 14 is an interface for transmitting and receiving data to and from the cloud server 20 or the like via the network 30. For example, a communication unit 25 is an interface that supports wired or wireless local area network (LAN) connection.

The operation panel 15 (input interface) receives inputs of various operations according to the operator of the image forming apparatus 10. The operation panel 15 transmits a signal indicating an operation input by the operator to the processor 11. For example, the operation panel 15 includes an input unit that receives an operation of copying a document. The operation panel 15 includes, for example, a keyboard, a numeric keypad, and a touch panel, as an operation unit.

The operation panel 15 displays various kinds of information to the operator of the image forming apparatus 10. That is, the operation panel 15 displays a screen indicating various kinds of information based on the signal from the processor 11. The operation panel 15 includes, for example, a liquid crystal display as a display unit.

The scanner 16 optically scans a document and reads an image of the document as image data. The scanner 16 reads the document as a color image. The scanner 16 is configured with a sensor array formed in a main scanning direction and the like. The scanner 16 moves the sensor array in a sub scanning direction and reads the entire document.

The input image processing unit 17 processes the image data read by the scanner 16. The input image processing unit 17 may process the image data from a unit other than the scanner 16. For example, the input image processing unit 17 may process image data sent from a universal serial bus (USB) memory, PC, or a smartphone.

The page memory 18 stores image data processed by the input image processing unit 17. The output image processing unit 19 processes the image data stored in the page memory 18 so that the forming unit 31 can print image data on paper.

The forming unit 31 prints image data processed by the output image processing unit 19 on a medium such as paper based on the control of the processor 11. For example, the forming unit 31 prints the image data on the medium by using a toner. The forming unit 31 forms a toner image on a photosensitive drum with a toner from a toner cartridge. The forming unit 31 transfers a toner image from the photosensitive drum to the transfer belt. The forming unit 31 transfers the toner image from the transfer belt to a printing medium such as paper. The forming unit 31 fixes the toner image onto the printing medium by heating the printing medium to which the toner image is transferred with a fixing device.

The forming unit 31 may print the image data on the medium by an ink jet method. The forming unit 31 may print the image data to the medium by heating thermal paper as the medium.

The card reader 32 obtains information from a card possessed by the user. The card reader 32 obtains information such as an ID for identifying the user from the card.

The card reader 32 obtains information from a magnetic card including a magnetic stripe, an integrated circuit (IC) card with an IC chip built therein, or the like.

For example, the card reader 32 is configured with a magnetic head for reading a magnetic stripe, a terminal that comes into contact with an IC chip to obtain information, or an antenna for wirelessly transmitting and receiving information to and from the IC chip. The card reader 32 transmits the obtained information to the processor 11. The image forming apparatus 10 is a printer, a copying machine, and/or the like.

Figure 3:
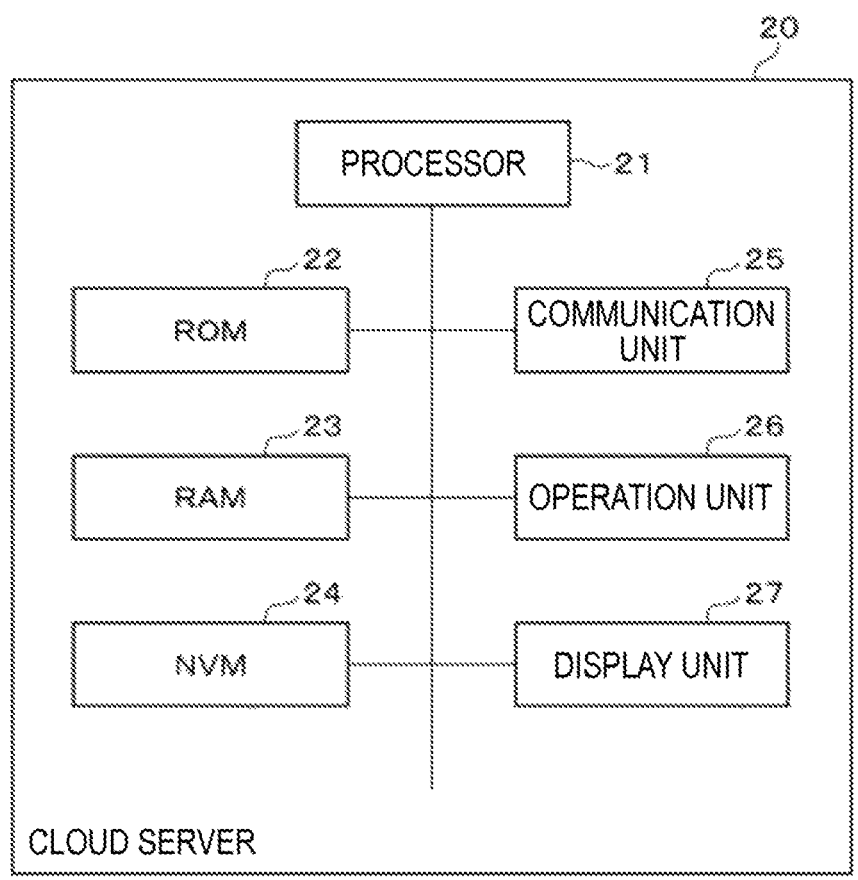
FIG. 3 is a block diagram illustrating a configuration example of a cloud server according to the first embodiment.

Subsequently, the cloud server 20 will be described. FIG. 3 illustrates a configuration example of the cloud server 20 according to the embodiment. FIG. 3 is a block diagram illustrating a configuration example of the cloud server 20. As illustrated in FIG. 3, the cloud server 20 includes a processor 21, a read-only memory (ROM) 22, a random-access memory (RAM) 23, a non-volatile memory (NVM) 24, the communication unit 25 (communication interface), an operation unit 26 (operation interface), a display unit 27 (display), and the like.

The processor 21 is connected to the ROM 22, the RAM 23, the NVM 24, the communication unit 25, the operation unit 26, and the display unit 27 via data buses or the like. The cloud server 20 may include a configuration, if necessary, in addition to the configurations illustrated in FIG. 3, or a specific configuration may be omitted from the cloud server 20.

The processor 21 has a function of controlling the entire operation of the cloud server 20. The processor 21 may include an internal cache, various interfaces, and the like. The processor 21 realizes various processes by executing programs stored in an internal memory, the ROM 22, or the NVM 24, in advance.

Some of the various functions realized by the processor 21 executing the programs may be functions realized by a hardware circuit. In this case, the processor 21 controls functions executed by the hardware circuit.

The ROM 22 is a non-volatile memory in which a control program, control data, and the like are stored in advance. The control program and the control data stored in the ROM 22 are incorporated in advance in response to the specification of the cloud server 20.

The RAM 23 is a volatile memory. The RAM 23 temporarily stores data or the like being processed by the processor 21. The RAM 23 stores various application programs based on the instruction from the processor 21. The RAM 23 may store data required for the execution of the application programs, the execution results of the application program, and the like.

The NVM 24 is a non-volatile memory in which data can be written and rewritten. For example, the NVM 24 is configured with an HDD, an SSD, a flash memory, or the like. The NVM 24 stores control programs, applications, various kinds of data, and the like in response to the operational use of the cloud server 20.

The communication unit 25 is an interface for performing communication with the network 30. That is, the communication unit 25 is an interface for transmitting and receiving data to and from the image forming apparatus 10 or the like via the network 30. For example, the communication unit 25 is an interface that supports wired or wireless LAN connection.

The operation unit 26 receives inputs of various operations from an operator. The operation unit 26 transmits a signal indicating the input operation to the processor 21. The operation unit 26 may be configured with a touch panel.

The display unit 27 displays the image data from the processor 21. For example, the display unit 27 is configured with a liquid crystal display. If the operation unit 26 is configured with a touch panel, the display unit 27 may be formed integrally with the operation unit 26. For example, the cloud server 20 is a personal computer (PC).

Subsequently, the functions realized by the cloud server 20 will be described. The functions realized by the cloud server 20 are realized by the processor 21 executing the programs stored in the ROM 22, the NVM 24, or the like.

The processor 21 realizes the following functions as the cloud service. For example, the processor 21 supports an Authorization Code flow or an Implicit flow of OAuth2.

First, the processor 21 has a function of issuing an authentication code for issuing an access token.

Here, it is assumed that the NVM 24 stores in advance an ID (user ID) and a password of a user to which the service is provided.

The processor 21 receives a request for a login screen from a browser installed in the image forming apparatus 10 via the communication unit 25. If the request is received, the processor 21 displays a login screen according to the request on a browser. The processor 21 receives inputs of the user ID and the password from the user via the login screen.

The processor 21 refers to the user ID and the password stored in the NVM 24 in advance and authenticates the user indicated by the input user ID. If the authentication of the user succeeds, the processor 21 transmits a response including the authentication code to the browser. For example, the authentication code is AuthCode or the like.

The processor 21 has a function of issuing an access token based on the authentication code.

The processor 21 receives the request for requiring the access token from a built-in app installed in the image forming apparatus 10 via the communication unit 25. The request includes an authentication code. The request may include a client ID, a client secret, and the like of the built-in app.

If the request is received, the processor 21 transmits the response including the access token to the built-in app via the communication unit 25. The access token is a token for accessing the user information of the user relating to the authentication code.

The processor 21 has a function of transmitting the user information based on the access token.

The user information is information used for shifting the image forming apparatus 10 to the login state. The user information is information relating to the logged-in user. For example, the user information is the name, authority, and quota of the user, and the like.

The processor 21 receives the request for requiring the user information from the built-in app installed in the image forming apparatus 10 via the communication unit 25. The request includes the access token.

If the request is received, the processor 21 obtains the user information corresponding to the access token from the NVM 24 or the like based on the access token. If the user information is obtained, the processor 21 transmits the response including the obtained user information to the built-in app via the communication unit 25.

Subsequently, the functions realized by the image forming apparatus 10 will be described. The functions realized by the image forming apparatus 10 are realized by the processor 11 executing the programs stored in the main memory 12 or the like.

Here, the processor 11 realizes the browser, a built-in server, and a built-in app. That is, the browser, the built-in server, and the built-in app are installed in the image forming apparatus 10.

The browser displays various kinds of information on the operation panel 15. The browser displays data (for example, html) from the built-in server or the cloud server 20 based on a uniform resource locator (URL). The browser receives an input of the operation to the operation panel 15. For example, the browser receives inputs of the user ID, the password, and the like. For example, the browser is an EMB.

The built-in server is shifted to the login state based on the user information. The built-in server is connected to the browser and the built-in app. The built-in server receives the login operation input for starting the login operation of the user via the browser. If the login operation input is received, the built-in server selects the built-in app for access to the cloud server 20. If one built-in app is installed, the built-in server selects the built-in app.

If the built-in app is selected, the built-in server obtains the URL (herein, a URL of a login page) for access from the built-in app to the cloud server 20. If the URL is obtained, the built-in server transmits the response (for example, html) that is redirected to the URL to the browser.

The built-in server transmits the request for requiring the user information to the built-in app. The request includes the authentication code from the browser. The built-in server obtains the response including the user information from the built-in app.

If the response is obtained, the built-in server is shifted to the login state based on the user information included in the response. For example, the built-in server displays the name indicated by the user information on the browser. The built-in server performs the printing operation based on the authority indicated by the user information. For example, the built-in server is an entry point.

The built-in app obtains the user information from the cloud server 20. The built-in app transmits the URL for access to the cloud server 20 to the built-in server according to the request from the built-in server.

The built-in app obtains the request for requiring the user information from the built-in server. If the request is obtained, the built-in app transmits the request for requiring the access token to the cloud server 20 via the communication interface 14. The request includes the authentication code from the built-in server. If the request is transmitted to the cloud server 20, the built-in app obtains the response including the access token from the cloud server 20 via the communication interface 14.

If the response is obtained, the built-in app transmits the request for requiring the user information to the cloud server 20 via the communication interface 14. The request includes the access token. If the request is transmitted to the cloud server 20, the built-in app obtains the response including the user information from the cloud server 20 via the communication interface 14.

If the response is obtained, the built-in app transmits the response including the user information to the built-in server. For example, the built-in app is an emb application.

The plurality of built-in apps may be installed. The built-in apps may transmit the URLs of the cloud services different from each other to the built-in server.

Figure 4:
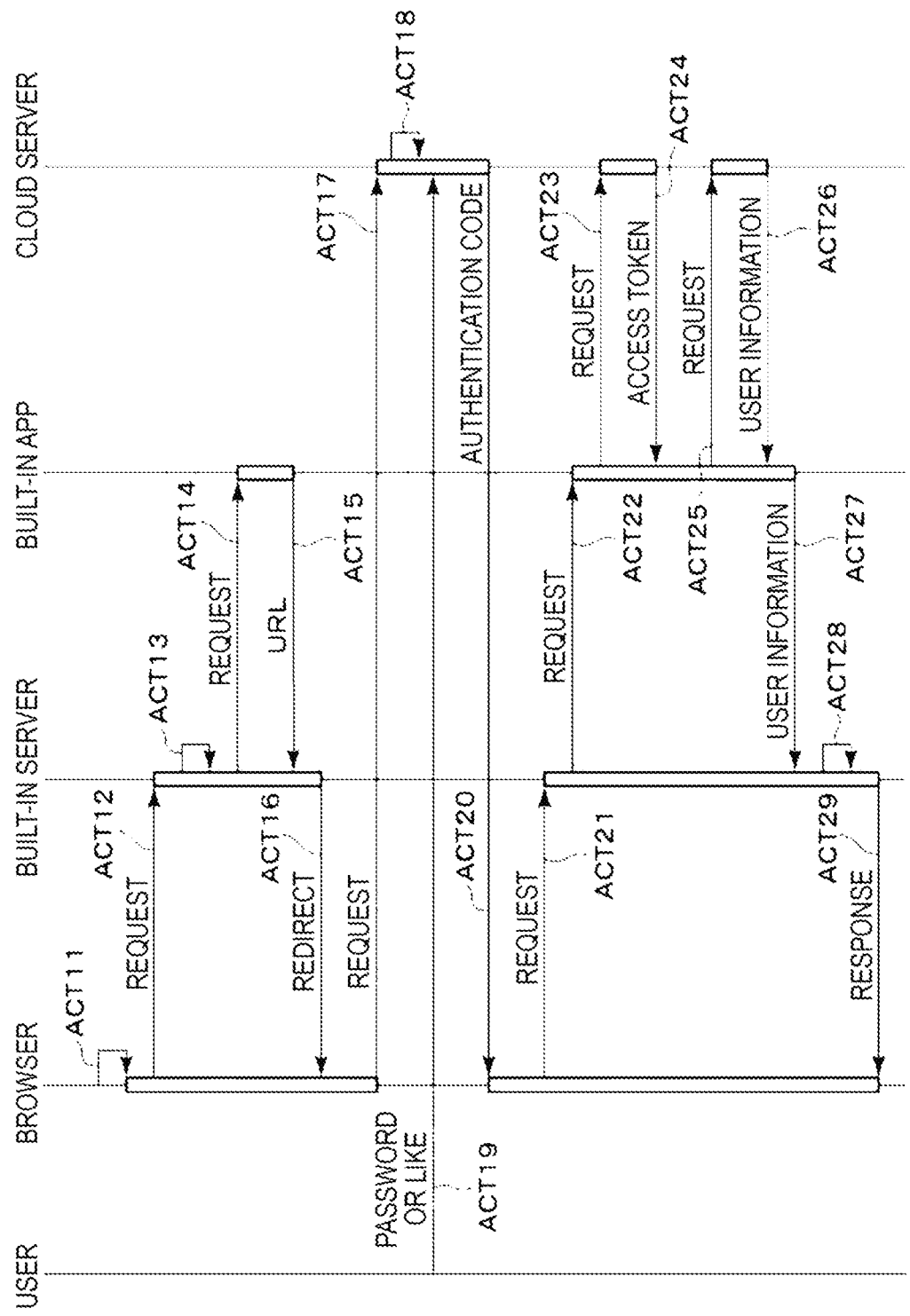
FIG. 4 is a sequence diagram illustrating an operation example of the authentication system according to the first embodiment.

Subsequently, the operation example of the authentication system 1 will be described. FIG. 4 is a sequence diagram for illustrating the operation example of the authentication system 1.

First, the browser receives the input of the login operation from the user (ACT 11). If the input of the login operation is received, the browser transmits a hypertext transfer protocol (HTTP) request to the built-in server (ACT 12).

The built-in server obtains the HTTP request. If the request is obtained, the built-in server selects the built-in app (ACT 13). If the built-in app is selected, the built-in server transmits the request for requiring the URL of the cloud server 20 to the selected built-in app (ACT 14).

The built-in app obtains the request. If the request is obtained, the built-in app transmits the response including the URL to the built-in server (ACT 15). The response may include the client ID and the like.

The built-in server obtains the response. If the response is obtained, the built-in server transmits the response that is redirected to the URL to the browser (ACT 16).

The browser obtains the response. If the response is obtained, the browser transmits the HTTP request to the URL according to the response via the communication interface 14 (ACT 17). The HTTP request may include the client ID and the like.

The cloud server 20 receives the request. If the request is received, the cloud server 20 displays the login screen on the browser (ACT 18).

Here, the user inputs the user ID and the password on the login screen via the operation panel 15 (ACT 19).

The cloud server 20 obtains the input user ID and the input password. If the user ID and the password are obtained, the cloud server 20 authenticates the user indicated by the user ID. Here, it is assumed that the cloud server 20 succeeds in the authentication of the user.

If the cloud server 20 succeeds in the authentication of the user, the cloud server 20 transmits a response including the authentication code to the browser (ACT 20). The response is redirected to the built-in server on the browser.

The browser receives the response via the communication interface 14. If the response is received, the browser transmits the HTTP request according to the response to the built-in server (ACT 21).

The built-in server obtains the HTTP request. If the HTTP request is obtained, the built-in server transmits the request for requiring the user information to the built-in app (ACT 22). The request includes the authentication code.

The built-in app obtains the request. If the request is obtained, the built-in app transmits the request for requiring the access token to the cloud server 20 via the communication interface 14 (ACT 23). The request includes the authentication code. The request may include the client ID, the client secret, and the like.

The cloud server 20 receives the request. If the request is received, the cloud server 20 obtains an access token corresponding to the authentication code included in the request. If the access token is obtained, the cloud server 20 transmits a response including the obtained access token to the built-in app (ACT 24).

The built-in app receives the response via the communication interface 14. If the response is received, the built-in app transmits the request for requiring the user information to the cloud server 20 via the communication interface 14 (ACT 25). The request includes the access token.

The cloud server 20 receives the request. If the request is received, the cloud server 20 obtains the user information corresponding to the access token included in the request. If the user information is obtained, the cloud server 20 transmits the response including the obtained user information to the built-in app (ACT 26).

The built-in app receives the response via the communication interface 14. If the response is received, the built-in app transmits the response including the user information to the built-in server (ACT 27). The built-in server obtains the response. If the response is obtained, the built-in server is shifted to the login state based on the user information (ACT 28).

If being shifted to the login state, the built-in server transmits the response indicating that the login is completed to the browser (ACT 29). If the built-in server transmits the response, the authentication system 1 ends the operation.

The built-in server may realize the functions of the built-in app (or some of the functions). In this case, the built-in server may operate based on a setting file or the like including the URL of the cloud server 20 and the like.

The built-in app may realize the functions of the built-in server (or some of the functions).

The built-in server may select the built-in app according to the operation of the user. The built-in app may transmit a portion of the user information (a portion used for the login) from the cloud server 20 to the built-in server.

The authentication system configured as described above receives the input of the user ID and the password of the cloud service when the user logs in the image forming apparatus. If the authentication system succeeds in the authentication in the cloud service, the authentication system transmits the authentication code from the cloud server to the image forming apparatus. The image forming apparatus obtains the access token from the cloud server by using the authentication code. The image forming apparatus obtains the user information from the cloud server by using the access token. The image forming apparatus is shifted to the login state based on the user information. As a result, the image forming apparatus can be independently shifted to the login state in cooperation with the cloud service.

Second Embodiment

Subsequently, a second embodiment will be described. An authentication system according to the second embodiment is different from that according to the first embodiment in that the image forming apparatus is shifted to the login state based on the information from a card possessed by the user. Therefore, regarding the other points, the same reference numerals are given and detailed descriptions thereof are omitted.

The configuration of the authentication system 1 according to the second embodiment is the same as that according to the first embodiment, and thus the description thereof is omitted.

Subsequently, the functions realized by the cloud server 20 will be described. The functions realized by the cloud server 20 are realized by the processor 21 executing the programs stored in the ROM 22, the NVM 24, or the like.

The processor 21 realizes the following functions as the cloud service. For example, the processor 21 supports the Authorization Code flow or the Implicit flow of OAuth2. The processor 21 realizes the following functions in addition to the functions according to the first embodiment.

First, the processor 21 has a function of issuing a demon token. The processor 21 normally issues a demon token for a predetermined built-in app based on the operation by a manager of the cloud service or the cloud server 20. That is, the manager registers a built-in app to which the demon token is issued in the cloud server 20. The demon token is a token that can obtain any user information (or some pieces of predetermined user information).

The processor 21 receives the request for requiring the demon token from the built-in app of the image forming apparatus 10 via the communication unit 25. The request may include the client ID and the client secret.

If the request is received, the processor 21 transmits the response including the demon token to the built-in app via the communication unit 25.

The processor 21 has a function of transmitting the user information corresponding to a card ID read from the card. Here, the NVM 24 stores the card ID and the user information in an associated manner.

The processor 21 receives the request for requiring the user information corresponding to the card ID via the communication unit 25. The request includes the card ID and the demon token. If the request is received, the processor 21 obtains the user information corresponding to the card ID from the NVM 24. If the user information is obtained, the processor 21 transmits the response including the obtained user information to the built-in app via the communication unit 25.

Subsequently, the functions realized by the image forming apparatus 10 will be described. The functions realized by the image forming apparatus 10 are realized by the processor 11 executing the programs stored in the main memory 12 and the like.

The processor 11 realizes the following functions in addition to the functions according to the first embodiment. The processor 11 realizes the built-in server and the built-in app.

The built-in server is shifted to the login state based on the user information corresponding to the card ID obtained from the card.

If the image forming apparatus 10 is activated, the built-in server causes the built-in app to obtain the demon token. For example, the built-in server transmits the notification indicating that the image forming apparatus 10 is activated to the built-in app.

The built-in server obtains the card ID from the card possessed by the user via the card reader 32. If the card ID is obtained, the built-in server transmits the request for requiring the user information corresponding to the card ID to the built-in app. The request includes the card ID.

The built-in server obtains the response including the user information. If the response is obtained, the built-in server is shifted to the login state based on the user information included in the response.

The built-in app obtains the user information from the cloud server 20. If the notification indicating that the image forming apparatus 10 is activated is obtained from the built-in server, the built-in app transmits the request for requiring the demon token to the cloud server 20 via the communication interface 14. The request may include the client ID and the client secret of the built-in app.

The built-in app receives the response including the demon token via the communication interface 14.

The built-in app obtains the request for requiring the user information corresponding to the card ID from the built-in server. If the request is obtained, the built-in app transmits the request for requiring the user information corresponding to the card ID to the cloud server 20 via the communication interface 14. The request includes the card ID and the demon token.

The built-in app receives the response including the user information via the communication interface 14. If the response is received, the built-in app transmits the response including the user information to the built-in server.

Figure 5:
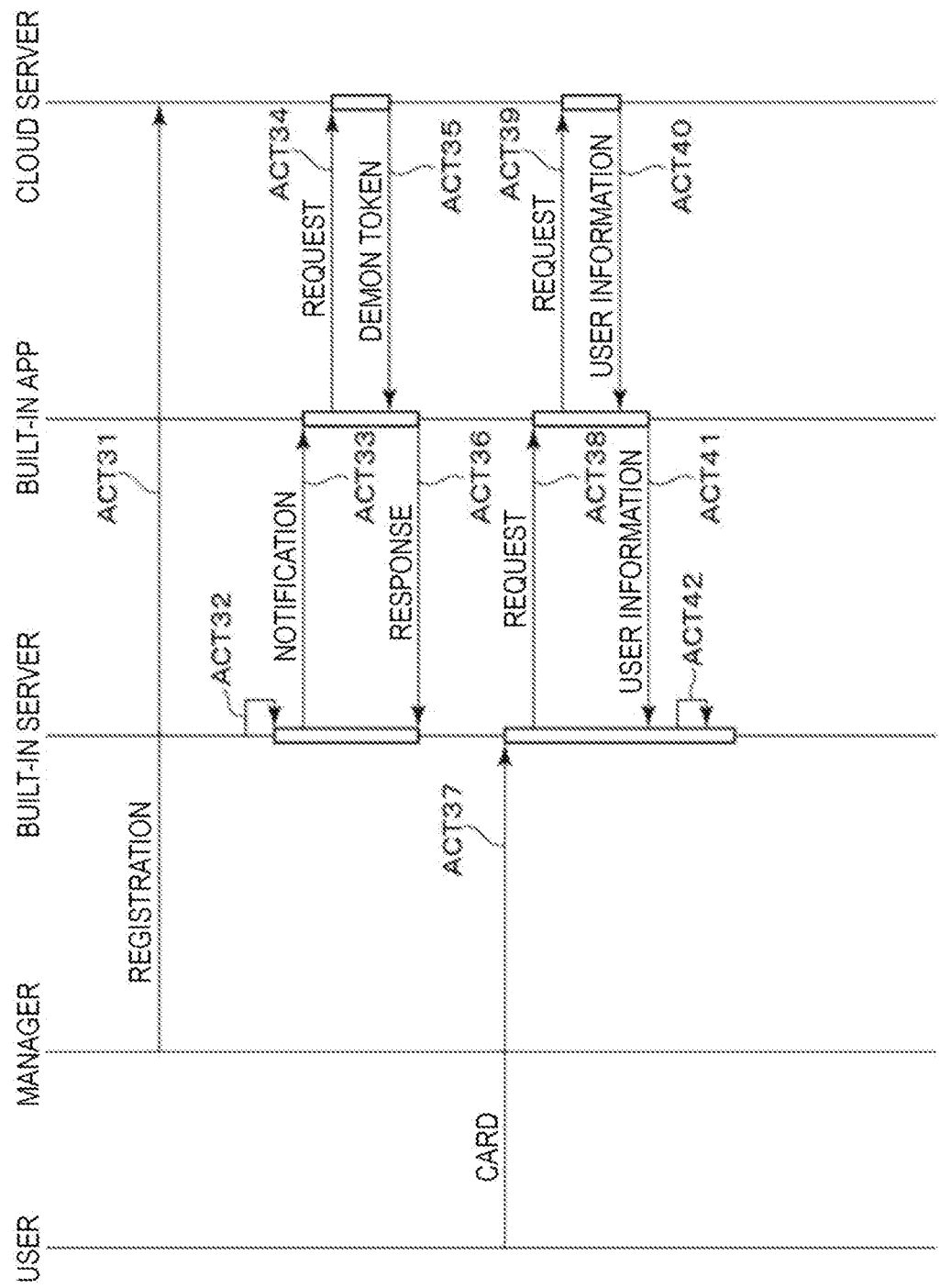
FIG. 5 is a sequence diagram illustrating an operation example of an authentication system according to a second embodiment.

Subsequently, the operation example of the authentication system 1 will be described. FIG. 5 is a sequence diagram illustrating the operation example of the authentication system 1.

First, the manager registers the built-in app to which the demon token is issued, in the cloud server 20 (ACT 31). Here, it is assumed that the built-in app of the image forming apparatus 10 is registered.

Here, the built-in server activates the image forming apparatus 10 based on the operation by the user or the like (ACT 32). If the image forming apparatus 10 is activated, the built-in server transmits a notification indicating that the image forming apparatus 10 is activated to the built-in app (ACT 33).

The built-in app obtains the notification. If the notification is obtained, the built-in app transmits the request for requiring the demon token to the cloud server 20 via the communication interface 14 (ACT 34).

The cloud server 20 receives the request. If the request is received, the cloud server 20 transmits a response including the demon token to the built-in app (ACT 35).

The built-in app receives the response. If the response is received, the built-in app transmits the response indicating that the demon token is obtained to the built-in server (ACT 36).

Here, the user causes the card reader 32 to read the card (ACT 37). The built-in server obtains the card ID from the card reader 32. If the card ID is obtained, the built-in server transmits a request for requiring the user information corresponding to the card ID to the built-in app (ACT 38).

The built-in app obtains the request. If the request is obtained, the built-in app transmits the request for requiring the user information corresponding to the card ID to the cloud server 20 via the communication interface 14 (ACT 39). The request includes the card ID and the demon token.

The cloud server 20 receives the request. If the request is received, the cloud server 20 transmits a response including the user information to the built-in app (ACT 40).

The built-in app receives the response via the communication interface 14. If the response is received, the built-in app transmits the response including the user information to the built-in server (ACT 41). The built-in server obtains the response. If the response is obtained, the built-in server is shifted to the login state based on the user information (ACT 42). If the built-in server is shifted to the login state, the authentication system 1 ends the operation.

After the demon token is once obtained, the built-in app may not perform ACT 34 and ACT 35.

The built-in server may realize the functions of the built-in app. In this case, the built-in server may operate based on the setting file or the like including the URL of the cloud server 20 or the like.

The built-in app may realize the functions of the built-in server (or some of the functions).

The authentication system configured as described above reads the card ID from the card ID possessed by the user. The authentication system obtains the user information corresponding to the card ID. The authentication system is shifted to the login state based on the obtained user information. As a result, if the authentication system does not receive inputs of the ID and the password from the user, the authentication system can be independently shifted to the login state in cooperation with the cloud service.

Third Embodiment

Subsequently, a third embodiment will be described. The authentication system according to the third embodiment is different from that according to the first embodiment in that the user logs in to the cloud service from the terminal possessed by the user. Therefore, regarding the other points, the same reference numerals are given and detailed descriptions thereof are omitted.

The configuration of the authentication system 1 according to the third embodiment is the same as that according to the first embodiment, and thus the description thereof is omitted.

Subsequently, the functions realized by the cloud server 20 will be described. The functions realized by the cloud server 20 are realized by the processor 21 executing the programs stored in the ROM 22, the NVM 24, or the like.

The processor 21 realizes the following function as the cloud service. For example, the processor 21 supports the Authorization Code flow or the Implicit flow of OAuth2.

The processor 21 realizes the following functions in addition to the functions according to the first and second embodiments.

First, the processor 21 has the function of issuing the code (login code) and the user code for login to the cloud service.

The processor 21 receives the request for requiring the login code from the built-in app via the communication unit 25. The request includes a device code for specifying the image forming apparatus 10 or the built-in app.

If the request is received, the processor 21 generates the login code corresponding to the image forming apparatus 10 or the built-in app. The login code indicates the URL of the login screen. The login code is a code obtained by encoding the URL of the login screen. Here, the login code is a two-dimensional code (for example, a quick response (QR) code (registered trademark)).

The processor 21 generates the user code corresponding to the image forming apparatus 10 or the built-in app. The user code consists of a character string. For example, the user code is WCZB.

If the login code and the user code are generated, the processor 21 transmits the response including the login code and the user code to the built-in app via the communication unit 25.

If the login is completed, the processor 21 has a function of issuing the access token.

The processor 21 receives the access from the terminal (for example, a smartphone) possessed by the user to the URL indicated by the login code. The processor 21 causes the terminal to display the login screen with respect to the access. The login screen receives the inputs of the user ID and the password. The login screen or the screen transitioned from the login screen receives the input of the user code.

The processor 21 obtains the user ID, the password, and the user code input to the login screen or the like. If the user ID, the password, and the user code are obtained, the processor 21 is shifted to the login state according to the user ID and the password.

If the processor 21 is shifted to the login state, the processor 21 transmits the response including the access token to the built-in app in response to the request, which corresponds to the login code or the access code, from the image forming apparatus 10 or the built-in app via the communication unit 25.

Until the login is completed, the processor 21 transmits the response indicating the error to the built-in app in response to the request from the built-in app via the communication unit 25.

Subsequently, the function realized by the image forming apparatus 10 will be described. The functions realized by the image forming apparatus 10 are realized by the processor 11 executing the program in stored the main memory 12 or the like.

The processor 11 realizes the following functions in addition to the functions according to the first and second embodiments. The processor 11 realizes the built-in server and the built-in app.

The built-in server displays the login code and the user code on the browser.

The built-in server transmits the request for requiring the login code and the user code to the built-in app. The built-in server obtains the response including the login code and the user code from the built-in app.

If the response is obtained, the built-in server causes the browser to display the login code and the user code.

Figure 6:
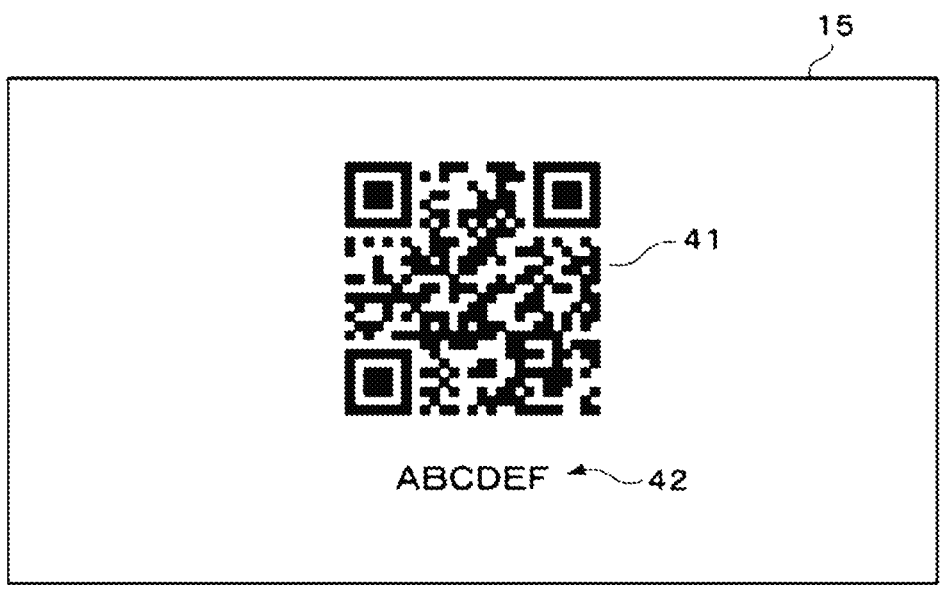
FIG. 6 is a diagram illustrating a display example of an image forming apparatus according to a third embodiment.

FIG. 6 illustrates an example of a login code 41 and a user code 42 displayed by the browser. As illustrated in FIG. 6, the operation panel 15 displays the login code 41 and the user code 42 by the operation of the browser.

The login code 41 is a code that can be read by the terminal possessed by the user. The user code 42 is a character string that can be visually recognized by the user.

The built-in app receives the access token from the cloud server 20 by polling.

The built-in app obtains the request for starting the polling from the built-in server. If the request is obtained, the built-in app transmits the request for requiring the access token to the cloud server 20 via the communication interface 14.

If the built-in app receives the response indicating an error from the cloud server 20 via the communication interface 14, the request is transmitted again to the cloud server 20 via the communication interface 14.

Until the response including the access token is received via the communication interface 14, the built-in app transmits the request to the cloud server 20 via the communication interface 14.

Figure 7:
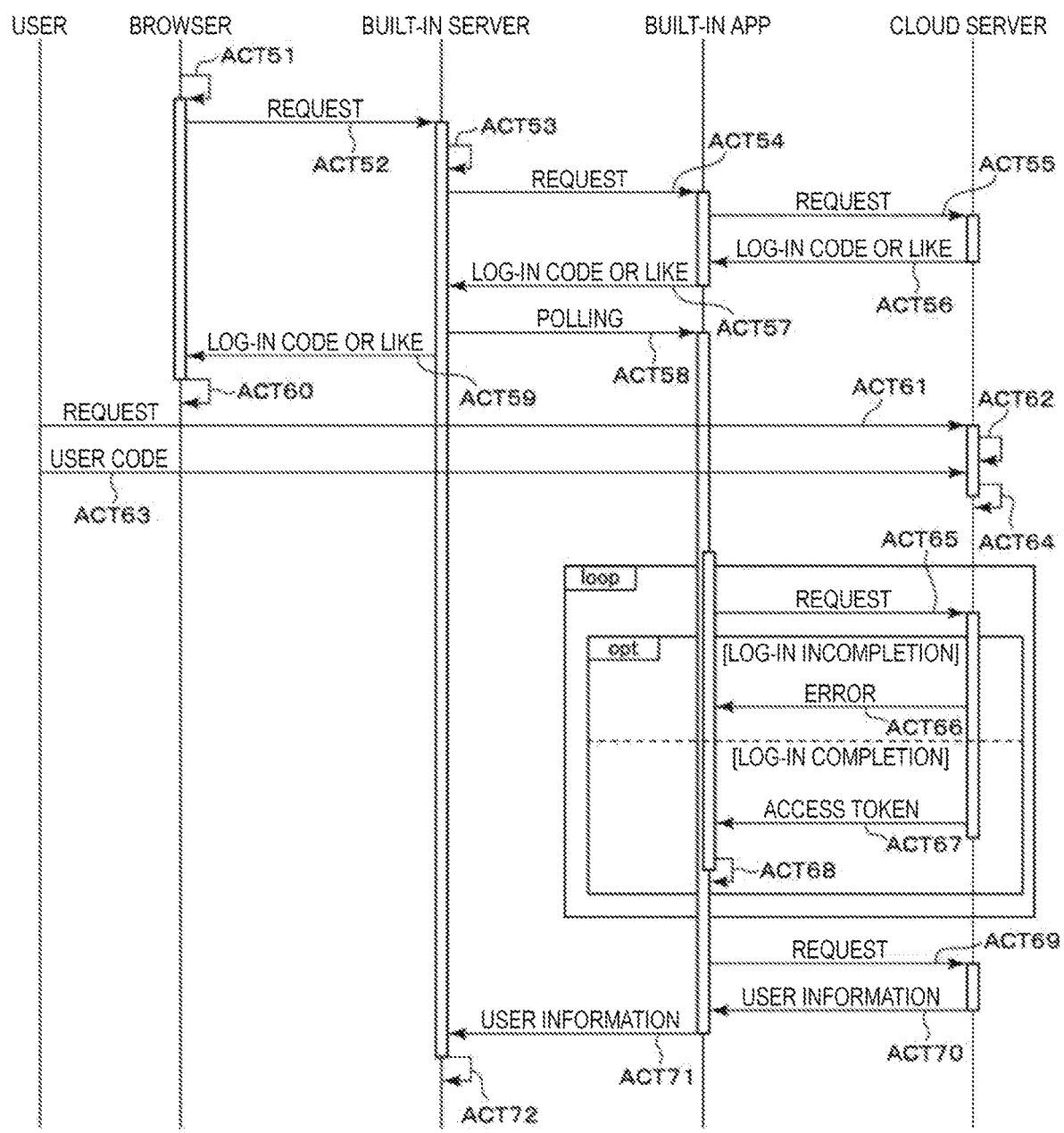
FIG. 7 is a sequence diagram illustrating an operation example of an authentication system according to the third embodiment.

Subsequently, the operation example of the authentication system 1 will be described. FIG. 7 is a sequence diagram illustrating the operation example of the authentication system 1.

First, the browser receives the input of the login operation from the user (ACT 51). If the input of the login operation is received, the browser transmits the HTTP request to the built-in server (ACT 52).

The built-in server obtains the HTTP request. If the request is obtained, the built-in server selects the built-in app (ACT 53). If the built-in app is selected, the built-in server transmits a request for requiring a login code and a user code to the selected built-in app (ACT 54).

The built-in app obtains the request. If the request is obtained, the built-in app transmits the request for requiring the login code and the user code to the cloud server 20 via the communication interface 14 (ACT 55).

The cloud server 20 receives the request. If the request is received, the cloud server 20 transmits a response including the login code and the user code to the built-in app (ACT 56).

The built-in app receives the response via the communication interface 14. If the response is received, the built-in app transmits the response including the login code and the user code to the built-in server (ACT 57).

The built-in server obtains the response. If the response is received, the built-in server causes the built-in app to start polling for obtaining the access token (ACT 58).

If the built-in app is caused to start the polling, the built-in server transmits the response including the login code and the user code to the browser (ACT 59).

The browser obtains the response. If the response is obtained, the browser displays the login code and the user code on the operation panel 15 (ACT 60).

Here, the user reads the login code by using the terminal such as a smartphone. The user transmits a HTTP request to the URL indicated by the login code via the terminal (ACT 61).

The cloud server 20 displays a screen for inputting the user code based on the HTTP request on the terminal (ACT 62). Here, the user inputs the user code to the screen. The terminal transmits the user ID, the password, and the input user code set in the own device in advance, to the cloud server 20 (ACT 63).

The cloud server 20 receives the input of the user code and the like. If the input of the user code and the like are received, the cloud server 20 is shifted to the login state (ACT 64).

The built-in app starts the polling for obtaining the access token according to the control of the built-in server. The built-in server transmits a request for requiring the access token to the cloud server 20 via the communication interface 14 (ACT 65).

The cloud server 20 receives the request. If the login to the cloud server 20 is not completed (that is, if ACT 64 is not completed), the cloud server 20 transmits a response indicating the error to the built-in app (ACT 66).

The built-in app receives the response via the communication interface 14. If the response is received, the built-in app returns to ACT 65.

If the login to the cloud server 20 is completed (that is, if ACT 64 is completed), the cloud server 20 transmits a response including the access token to the built-in app (ACT 67).

If the response including the access token is received, the built-in app breaks a loop (ACT 68).

If the loop is broken, the built-in app transmits a request for requiring the user information to the cloud server 20 via the communication interface 14 (ACT 69). The request includes the access token.

If the cloud server 20 receives the request. If the request is received, the cloud server 20 transmits a response including the user information corresponding to the access token included in the request to the built-in app (ACT 70).

The built-in app receives the response via the communication interface 14. If the response is received, the built-in app transmits the response including the user information to the built-in server (ACT 71). The built-in server obtains the response. If the response is obtained, the built-in server is shifted to the login state based on the user information (ACT 72). If the built-in server is shifted to the login state, the authentication system 1 ends the operation.

The login code may indicate the URL of the login screen and the user code. In this case, the user may not input the user code. The URL of the login screen may be set on a per user basis. In this case, the cloud server 20 may not issue the user code.

The built-in server may realize the function of the built-in app. In this case, the built-in server may operate based on the setting file or the like including the URL of the cloud server 20 or the like.

The built-in app may realize the function of the built-in server (or some of the functions).

The authentication system configured as described above shifts the cloud server to the login state by using the user ID and the password set in advance in the terminal possessed by the user. As a result, the authentication system can shift the image forming apparatus to the login state without receiving the input of the user ID and the password from the user.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising:
a display;
a communication interface configured to transmit data to and receive data from a cloud server that provides a cloud service; and
a processor configured to:
receive a login code and a user code from the cloud server;
display the login code and the user code on the display so that (a) a user can read the login code from the display and transmit a first request to the cloud server based on the login code, (b) the cloud server can cause the user device to display an input screen for entry of the user code displayed by the display in response to receiving the first request, and (c) the user device can receive the user code via the input screen and transmit the user code to the cloud server;
transmit a second request for an access token to the cloud server;
transmit the second request for the access token to the cloud server again in response to receiving a response indicating an error, wherein the response indicating the error is received when the user code has not yet been received by the cloud server;
receive the access token from the cloud server via the communication interface following receipt of the user code by the cloud server;
transmit a third request including the access token to the cloud server via the communication interface;
receive a response to the third request including user information from the cloud server via the communication interface; and
shift to a login state based on the user information.

2. The image forming apparatus of claim 1, wherein the user information includes an authority of a user.

3. A method comprising:
receiving, by an image forming apparatus, a login code and a user code from a cloud server;
displaying, by the image forming apparatus, the login code and the user code on a display of the image forming apparatus;
reading, by a user device, the login code from the display;
transmitting, by the user device, a first request to the cloud server based on the login code;
causing, by the cloud server, the user device to display an input screen for entry of the user code displayed by the image forming apparatus in response to receiving the first request;
receiving, by the user device, the user code via the input screen;
transmitting, by the user device, at least the user code to the cloud server;
transmitting, by the image forming apparatus, a second request for an access token to the cloud server;
transmitting, by the image forming apparatus, the second request for the access token to the cloud server again in response to receiving a response indicating an error, wherein the response indicating the error is received when the user code has not yet been received by the cloud server;
receiving, by the image forming apparatus, the access token from the cloud server following receipt of the user code by the cloud server;
transmitting, by the image forming apparatus, a third request including the access token to the cloud server;

receiving, by the image forming apparatus, a response to the third request including user information from the cloud server; and shifting, by the image forming apparatus, to a login state based on the user information.

4. The method of claim 3, wherein the user information includes an authority of a user.

* * * * *